United States Patent Office 2,816,925
Patented Dec. 17, 1957

2,816,925

DIAMINES

Robert Arthur Smiley, Woodbury, N. J., assignor to E. I. du Pont de Nemours and Company, Wilmington, Del., a corporation of Delaware No Drawing. Application October 7, 1955
Serial No. 539,265

8 Claims. (Cl. 260—563)

The present invention relates to novel nitro compounds and their preparation. More particularly, the present invention relates to novel dinitro compounds. N,N'-bis[(1-nitrocycloalkyl)methyl]alkylene diamines, and a method of preparing the same.

In general, nitro compounds have found widespread application because of the ease with which they are reduced to amines, which are useful in the production of dyes and emulsifiers. In particular, the subject compounds are of value because of the ease with which they are hydrogenated to tetramines excellent as epoxy-resin curing agents; the details on the method of preparation of these curing agents can be found in my copending application Serial No. 539,266, filed October 10, 1955.

Accordingly, an object of the present invention is to provide valuable new nitro compounds. Another object of the present invention is to provide valuable new nitro compounds by an economically feasible process. A still further object of the present invention is to provide valuable new nitro compounds which are readily hydrogenated to form superior epoxy-resin curing agents. Other objects will become apparent as the invention is further described.

I have found that the foregoing objects may be achieved when I mix together a nitro cycloalkane, formaldehyde, and an alkylene diamine.

In accordance with the process of the present invention, the nitrocycloalkane, formaldehyde, and the alkylene diamine are mixed together at a temperature within the range of the freezing point of the reaction mixture and the boiling point of the mixture.

The following examples serve to illustrate specific embodiments of the method of carrying out the process of the present invention. However, they will be understood to be illustrative only and not to limit the invention in any manner. The parts in the examples are parts by weight unless otherwise designated.

Example 1

Fifteen parts of ethylenediamine was added slowly over a period of thirty minutes to a mixture of 65 parts of nitrocyclohexane and 50 parts of a 36% aqueous solution of formaldehyde at a rate such that the reaction mixture was held at room temperature, while the mixture was stirred constantly. After the addition of the diamine was complete, the reaction mixture was stirred for four hours. The mixture then was allowed to stand for about sixteen hours, after which time it was poured into 218 parts of 18% hydrochloric acid. The white precipitate which formed was removed by filtration, washed with acetone, and dried. A yield of 71 parts (90%) of the dihydrochloride of N,N'-bis[(1-nitrocyclohexyl)methyl]ethylenediamine (M. P., 205–210° C.) was obtained.

The dihydrochloride was neutralized with ammonium hydroxide, and the free dinitro diamine was removed by filtration. The product was recrystallized from diethyl ether, and a yield of 53 parts (75%) of white crystalline N,N'-bis[(1-nitrocyclohexyl)methyl]ethylenediamine (M. P., 72–73° C.) was obtained.

*Analysis.*—Found: C, 56.06, 55.92; H, 8.65, 8.91; N, 16.06, 15.86. Calcd. for $C_{16}H_{30}N_4O_4$: C, 56.10; H, 8.77; N, 16.37.

Example 2

One-hundred parts of a 36% aqueous solution of formaldehyde was added dropwise to a mixture consisting of 129 parts of nitrocyclohexane, 45 parts of 2-hydroxy-1,3-propylenediamine, and 3 parts of "Triton" B (a quaternary ammonium hydroxide manufactured by Rohm and Haas Co.) as a 25% methanolic solution at a rate such that the temperature of the mixture was held at about 55° C. After all the formaldehyde was added, the mixture was stirred for six hours and then was poured into 436 parts of 18% hydrochloric acid. This mixture was stirred well and then allowed to stand for two hours. The white salt which had formed was filtered off, washed with acetone, and dried. The yield of N,N'-bis[(1-nitrocyclohexyl)methyl]-2-hydroxy-1,3-propylenediamine dihydrochloride was 174 parts (79%).

One hundred and forty parts of the dihydrochloride was neutralized with ammonium hydroxide. The oil which formed was washed with water and taken up in diethyl ether. The ether extract was treated with activated carbon and then dried. The ether was pumped off; the residue, N,N'-bis[(1-nitrocyclohexyl)methyl]-2-hydroxy-1,3-propylenediamine, was a nodistillable, yellow, viscous oil ($N_D^{25}$, 1.4953). A yield of 82 parts (44%) of this oil was obtained.

Example 3

Nitrocyclohexane in the amount of 129 parts and 83 parts of hexamethylenediamine were added to a reaction vessel equipped with a stirrer and a dropping funnel. The reactor was placed in an ice bath, and the content of the reactor was cooled to 10° C. Eighty-three parts of a 36% aqueous solution of formaldehyde was added dropwise to the cooled, stirred mixture at a rate such that the reaction temperature did not exceed 15° C. After the addition of formaldehyde was complete, the mixture was allowed to stand at room temperature for about 48 hours. Then, the lower layer of organic material was extracted with 71 parts of diethyl ether. Concentrated hydrochloric acid was added to the ether extract, and the precipitated white dihydrochloride salt of the N,N'-bis[(1-nitrocyclohexyl)methyl]hexamethylenediamine was removed by filtration and washed with ethanol. The ethanol-dihydrochloride mixture was filtered to remove the dihydrochloride, which then was slurried in 10% sodium hydroxide solution. The free dinitro diamine was removed from the slurry by filtration and then was recrystallized from a mixture of diethyl ether and petroleum ether. A 32% yield (63 parts) of N,N'-bis[(1-nitrocyclohexyl)methyl]-hexamethylenediamine, a white crystalline solid melting at 51–52° C., was obtained.

*Analysis.*—Found: C, 61.09, 61.13; H, 9.40, 9.45; N, 14.25, 14.13. Calcd. for $C_{20}H_{38}N_4O_4$: C, 60.30; H, 9.55; N, 14.07. Neutral equivalent: Found: 199.7, 199.5. Calcd.: 199.0.

In general, the novel dinitro compounds are light-colored, white to yellow, solids or liquids, which are insoluble in water and cyclohexane, soluble or slightly soluble in ethanol and diethyl ether, and soluble in carbon tetrachloride, chloroform, benzene, and acetone.

The N,N' - bis[(1 - nitrocycloalkyl)methyl]alkylene diamines were formed in good yields by the reaction of a nitro cycloalkane, formaldehyde, and an alkylene diamine in the absence of a catalyst. However, these reactants may be mixed together in the presence of a suitable catalyst. Any base, organic or inorganic, constitutes a suitable catalyst. Included in this classification are quaternary ammonium compounds, e. g., tetramethyl-, tetraethyl-, or tetraethanol-ammonium hydroxide or "Triton" B; alkali metal hydroxides, e. g., sodium, potassium, or lithium hydroxide; alkaline-earth metal hydroxides, e. g., calcium, barium, or strontium hydroxide; sodium carbonate; and anion-exchange resins. Water-soluble bases may be added most conveniently in the form of an aqueous or alcoholic solution.

Higher yields of the desired product are obtained when the reaction of the nitro cycloalkane, formaldehyde, and the alkylene diamine is carried out in a mutual solvent for all the reactants. Alkanols containing 1 to 3 carbon atoms, e. g., methanol, ethanol, or isopropanol, are the preferred solvents. Furthermore, the nitro cycloalkane, formaldehyde, and the alkylene diamine preferably are present in substantially stoichiometric amounts. However, the use of more than a stoichiometric amount of the formaldehyde is not deleterious to the yields of the dinitro compounds obtained according to the process of the present invention.

The preparation of the N,N'-bis[(1-nitrocycloalkyl)-methyl]alkylene diamines may be carried out at a temperature within the range of the freezing point of the reaction mixture and the boiling point of the mixture. The use of low temperatures, i. e., below room temperature, requires external cooling and longer reaction times. The use of pressure permits the use of higher temperatures and subsequently a quickening of the reaction.

Example 1 describes a means of separating the dinitro compounds produced by the process of the present invention. For example, after completion of the reaction, hydrochloric acid is added to the reaction mixture to precipitate the dinitro diamino compounds as their dihydrochloride salts, which then are neutralized with base to give the free dinitro diamino compounds. Solid dinitro compounds may be purified further by recrystallization from a suitable solvent, e. g., diethyl ether.

Although the process of the present invention has been illustrated by the production of novel dinitro compounds from nitrocyclohexane and ethylenediamine, hexamethylenediamine, or 2-hydroxy-1,3-propylenediamine, the use of other nitro cycloalkanes and other alkylene diamines is equally feasible. For example, nitrocycloheptane or nitrocyclopentane may be substituted for nitrocyclohexane, and pentamethylenediamine may be substituted for the ethylenediamine, the hexamethylenediamine, or the 2-hydroxy-1,3-propylenediamine.

Although the preceding examples illustrate the process as a batchwise process, the process of the present invention also may be carried out in a continuous manner. For example, the nitro cycloalkane, formaldehyde, and the alkylene diamine can be added to the reaction zone continuously in a manner such that substantially stoichiometric amounts of the reactants are maintained in said zone, while the reaction product is continuously removed from said zone.

The invention has been described in detail in the foregoing. It will be apparent to those skilled in the art that many variations are possible without departure from the scope of the invention. I intend, therefore, to be limited only by the following claims:

I claim:

1. N,N' - bis[(1 - nitrocycloalkyl)methyl]alkylene diamines.

2. A process for the preparation of N,N'-bis[(1-nitrocycloalkyl)methyl]alkylene diamines which comprises mixing at least stoichiometric amounts of a nitro cycloalkane, formaldehyde, and an alkylene diamine at a temperature within the range of the freezing point of the mixture and the boiling point of the mixture.

3. Process for the preparation of N,N'-bis[(1-nitrocycloalkyl)methyl]alkylene diamines which comprises mixing at least stoichiometric amounts of a nitro cycloalkane, formaldehyde, and an alkylene diamine in an aqueous solution of a 1–3 carbon alkanol at a temperature within the range of the freezing point of the mixture and the boiling point of the mixture.

4. N,N' - bis[(1 - nitrocyclohexy)methyl]ethylenediamine.

5. A process for the preparation of N,N'-bis[(1-nitrocyclohexyl)methyl]ethylenediamine which comprises mixing at least stoichiometric amounts of nitrocyclohexane, formaldehyde, and ethylene diamine in an aqueous solution of a 1–3 carbon alkanol at a temperature within the range of the freezing point of the mixture and the boiling point of the mixture, and thereafter recovering said dinitro compound.

6. N,N' - bis[(1 - nitrocyclohexyl)methyl] - 2 - hydroxy-1,3-propylenediamine.

7. N,N' - bis[(1 - nitrocyclohexyl)methyl]hexamethylenediamine.

8. A process for the preparation of N,N'-bis[(1-nitrocycloalkyl)methyl]alkylene diamines which comprises mixing at least stoichiometric amounts of a nitro cycloalkane, formaldehyde, and an alkylene diamine in the presence of a catalyst selected from the group consisting of organic and inorganic bases.

References Cited in the file of this patent

UNITED STATES PATENTS

| | | |
|---|---|---|
| 2,627,491 | Szabo et al. | Feb. 3, 1953 |
| 2,739,981 | Szabo et al. | Mar. 27, 1956 |

U. S. DEPARTMENT OF COMMERCE
PATENT OFFICE

CERTIFICATE OF CORRECTION

Patent No. 2,816,925                                        December 17, 1957

Robert Arthur Smiley

It is hereby certified that error appears in the printed specification of the above numbered patent requiring correction and that the said Letters Patent should read as corrected below.

Column 2, line 29, for "nodistillable" read -- nondistillable --; line 59, for "199.5." read -- 199.5; --; column 4, line 27, for "nitrocyclohexy" read -- nitrocyclohexyl --.

Signed and sealed this 25th day of February 1958.

(SEAL)
Attest:

KARL H. AXLINE                                                 ROBERT C. WATSON
Attesting Officer                                        Commissioner of Patents